United States Patent [19]
Weller

[11] 3,926,218
[45] Dec. 16, 1975

[54] VALVE
[75] Inventor: Horst Weller, Heilbronn, Germany
[73] Assignee: Cillichemie Ernst Vogelmann, Heilbronn, Germany
[22] Filed: Sept. 13, 1974
[21] Appl. No.: 505,647

[52] U.S. Cl............................. 137/625.27; 251/367
[51] Int. Cl.²........................................ F16K 11/04
[58] Field of Search.......... 137/625.27, 625.69, 625, 137/625.26, 625.5; 251/367

[56] References Cited
UNITED STATES PATENTS

| | | | |
|---|---|---|---|
| 412,327 | 10/1889 | Gibson............................ | 137/625.27 |
| 517,589 | 4/1894 | Reichmann...................... | 137/625.27 |
| 782,966 | 2/1905 | Kenner ........................... | 137/625.27 |
| 2,152,084 | 3/1939 | Paine .............................. | 137/625.27 |
| 2,739,119 | 3/1956 | Stoner........................ | 137/625.27 X |
| 2,981,290 | 4/1961 | Meyer.............................. | 137/625.5 |
| 3,070,125 | 12/1962 | Gulley............................. | 137/625.27 |
| 3,202,170 | 8/1965 | Holbrook........................ | 137/625.27 |
| 3,208,720 | 9/1965 | Huntington..................... | 137/625.27 |

FOREIGN PATENTS OR APPLICATIONS 1,229,162  4/1971  United Kingdom............ 137/625.27

*Primary Examiner*—Irwin C. Cohen
*Assistant Examiner*—Robert J. Miller
*Attorney, Agent, or Firm*—Hans Berman

[57] ABSTRACT

A reversing valve for hydraulic machinery has two valve discs mounted on a common drive rod for movement between respective pairs of valve seats. Throttling members on each disc enter the aperture of the engaged valve seat and reduce the flow section of the same during initial movement of the valve disc away from the valve seat.

10 Claims, 1 Drawing Figure

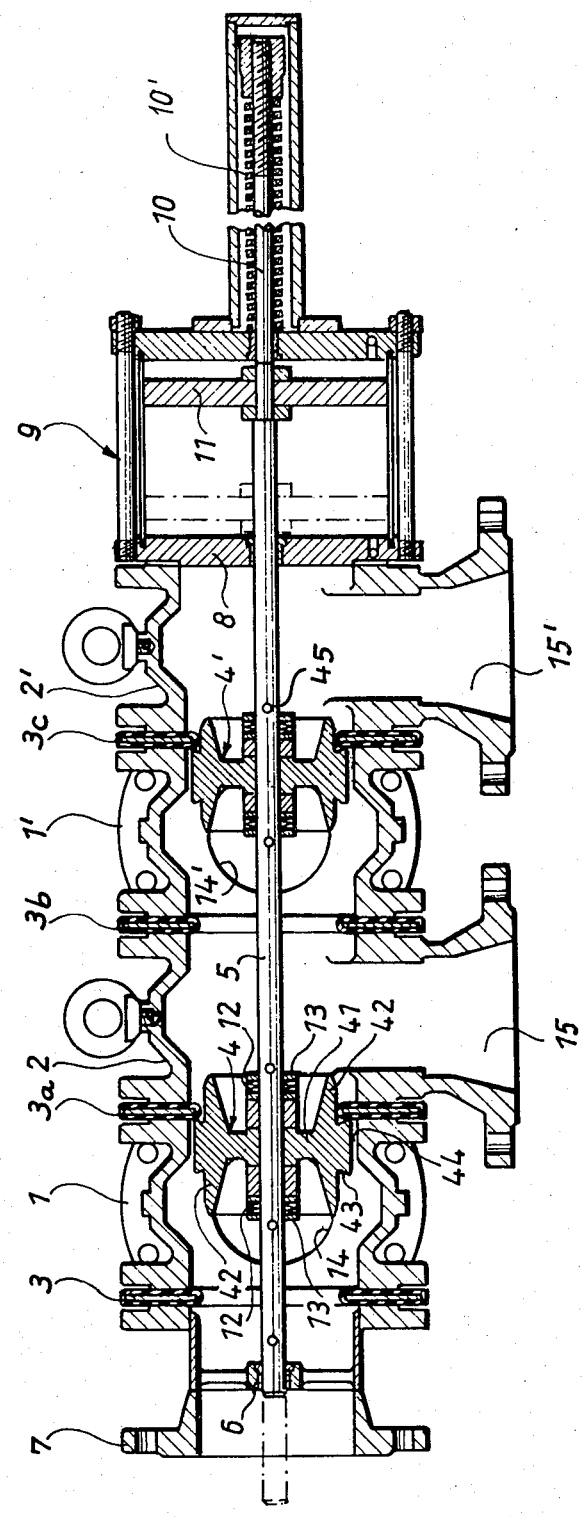

VALVE

This invention relates to valves for controlling the flow of liquids, and will be described hereinafter with specific reference to a multi-way valve suitable for reversing the direction of liquid flow in a hydraulic system.

It is common practice to employ disc or poppet valves for the above-described application, and several valve discs may be mounted on a common stem. The known valves quickly open the aperture in a valve seat when moving away from the same, and suddenly block liquid flow as they engage the valve seat. The inertia of the body of liquid whose velocity is changed abruptly by opening or closing of the valve exerts a sudden stress or shock on the elements of the hydraulic system causing noise and potentially mechanical damage.

The object of the invention is the provision of a valve which may control the flow of large bodies of liquid without causing significant mechanical shock or noise.

In one of its basic aspects, the invention provides a housing defining a cavity and formed with a plurality of ports leading outward of the cavity. First and second valve seat members are arranged at first and second ports of the housing and are formed with apertures of predetermined cross section A valve member in the cavity may be moved by a drive arrangement between first and second operating positions in which the valve member sealingly engages the valve seat members respectively and seals the aperture of the engaged valve seat member. A throttling member is mounted on the valve member and projects from the same into the aperture of the engaged first valve seat member when the valve member is in its first operating position. The throttling member has a smaller cross section than the aperture.

In its more specific aspects, the valve has a casing consisting mainly of a plurality of sections juxtaposed in a row. Each section defines a cavity therein and is formed with two ports aligned in the direction of the row with the ports of the other sections. A valve seat member is sealingly interposed between each pair of juxtaposed sections and formed with an aperture aligned with the ports in the afore-mentioned direction, whereby two valve seat members are associated with each section. A drive rod passes through the aligned ports and apertures and carries at least two valve disc assemblies. Each valve disc assembly is received in the cavity of a respective casing section for movement with the drive rod between respective positions of sealing engagement with the two valve seat members associated with the receiving section. Each assembly includes two throttling portions received in the apertures of the two valve seat members in the two positions of the valve disc assembly respectively. The cross section of each throttling portion is smaller than the cross section of the receiving aperture transverse to the direction of drive rod movement.

Other features, additional objects, and many of the attendant advantages of this invention will readily be appreciated as the same becomes better understood by reference to the following detailed description of a preferred embodiment when considered in connection with the appended drawing whose sole FIGURE shows a valve of the invention in elevational section.

The casing of the illustrated valve consists of four identical sections 1, 2, 1', 2' flanged to each other in a straight row in which they alternate with valve seat plates 3, 3a, 3b, 3c clamped between the flanges of adjacent members of the row and between the first casing section 1 and a flanged connector 7. The plates 3 are flat steel rings covered with resilient plastic. A radial end plate 8 of a cylinder 9 is flanged to the last section 2' of the row. The bolts and nuts which connect the flanges in a conventional manner have been omitted from the drawing in order not to crowd the same. Flanged integral nipples 14, 15, 14', 15' lead outward of the cavities of the casing sections transversely to the row.

The piston 11 in the cylinder 9 carries a piston rod 10. A helical compression spring 10' coiled about the piston rod 10 normally holds the piston 11 in the fully drawn position. When pneumatic or hydraulic pressure fluid is admitted to the cylinder 9 by a pilot valve, not shown, the piston 11 moves into the position shown in chain-dotted outline.

A cylindrical drive rod 5 is coaxially fastened to the piston 11 and passes outward of the cylinder 9 through a packing in the end plate 8, through aligned ports of the four casing sections and aligned central apertures of the four valve seat plates 3, 3a, 3b, 3c. The end of the drive rod 5 remote from the cylinder 9 is slidably supported in the connector 7 by a spider 6.

Two valve disc assemblies 4, 4' are mounted on the drive rod 5 in the casing sections 1, 1' respectively which provide housings for the assemblies. Each assembly is a unitary casting essentially consisting of a circular disc portion 41 perpendicular to the axis of the drive rod 5 and two coaxial throttling rings 42 projecting from the disc portion 41 in opposite directions longitudinal relative to the rod 5. The outer circumference of the disc portion 41 projects radially beyond the rings 42 to provide shoulders 43 sealingly engaging the rim of a valve seat plate 3a, 3c about the central aperture of the latter in the illustrated condition of the valve.

The rod 5 is slidably received in a mating central bore of each disc portion 41, and axial movement of each assembly 4, 4' is limited by two transverse pins 45 in the rod 5 and by cup springs 12 placed between the pins 45 and the disc portions 42 and backed by flat washers 13. The valve disc assemblies 4, 4' have identical radial dimensions, but differ in their axial dimensions, particular in those of their throttling rings 42. The outer walls of the latter taper in an axial direction away from the associated disc portion 41, the taper being conical over an axial portion of each ring 42.

The aligned cylindrical ports of the four casing sections are somewhat greater in cross section than the central apertures in the valve seat plates and the disc portions 41 so that an annular gap 44 is defined between each disc portion 41 and the wall of the port in which the disc portion is received when it engages a valve seat plate.

In the position of the piston 11 and the rod 5 shown in fully drawn lines, the valve assembly 4 sealingly engages the valve seal plate 3a separating the casing sections 1, 2, and the valve assembly 4' similarly engages the plate 3c between the casing sections 1', 2'. The valve provides a flow path between the nippels 14' and 15, and a separate flow path between the nipple 14 and the connector 7. The nipple 15' is blocked. When the piston 11 and the drive rod 5 are moved into their positions shown in chain-dotted lines by pressure fluid admitted to the cylinder 9 in a conventional manner, not specifically illustrated, a flow path is opened between the nipples 14', 15' and a separate path between the nipples 14, 15 while the connector 7 is blocked. The device thus may function as a reversing valve for double-acting hydraulic apparatus and the like in a known manner.

It differs from a conventional reversing valve in its operating characteristics due to the throttling rings 42. As the valve assembly 4 moves toward the left from the illustrated position, the full flow section of the valve seat plate 3a does not at once become available to the controlled fluid, but only an annular throttling gap opens between the outer axial face of the throttling ring 42 and the rim of the valve seat plate 3a. Additional throttling action is provided by the gap 44 between the disc 41 and the cylindrical wall of the casing section 1 bounding the port. During movement of the valve assembly 4 away from the illustrated position, the gap between the tapering ring 42 and the plate 3a gradually widens while the axial length of the gap 44 decreases. When the throttling ring 42 clears the central aperture in the plate 3a, it defines a wider, but still restricted, annular channel with the cylindrical wall of the port in the section 1 before the valve assembly 4 moves out of effective range of the plate 3a and the associated casing port and gradually seals the orifice in the valve seat plate 3.

The valve assembly 4' similarly cooperates with the valve seat plates 3c and 3b, but the throttling action of the assembly 4' is shorter because of its reduced axial length. Both assemblies avoid the stresses on the rod 5 and other elements of the hydraulic circuit commonly encountered in systems whose valves suddenly open their full flow sections.

The specific characteristics of each valve section may be modified by varying not only the axial length, but also the taper of the throttling rings 42. The two flow paths through the illustrated valve casing need not be opened and closed simultaneously although both valve disc assemblies 4, 4' are mounted on the common drive rod 5 because of the resilient mountings which permit limited axial movement of the valve disc assemblies on the drive rod 5 away from the position of greatest relaxation of the cup springs 12.

The casing sections 1, 1' are offset from the sections 2, 2' in the illustrated valve 90° relative to the valve axis for better access to the nipples 14, 14', 15, 15', but other arrangements are possible in an obvious manner. The advantageous features of the illustrated valve are available at least in part in modified valves having more or fewer than the two illustrated valve disc assemblies and controlling flow of a working fluid in paths other than the two separate paths described above.

For greatest effect, it is necessary that the outer cross section of each throttling ring 42 be at least three quarters of the aperture cross section in the valve seat plate in which the throttling ring may be received, and the projecting length of the throttling ring must be greater than the length of the associated aperture in the direction of movement of the valve disc assembly. This length also should be smaller than the spacing between the two terminal operating positions of the valve disc assembly so that the throttling effect decreases to zero as the throttling ring moves away from a valve seat member. In the illustrated embodiment of the invention, the ports of each casing are bounded by cylindrical walls, and the projecting length of each throttling ring is not greater than the combined axial dimension of the aperture in a valve seat plate and of one cylindrical port wall.

Some of the advantages of this invention are available if some dimensional relationships outlined above are not adhered to strictly, and it should be understood, therefore, that the foregoing disclosure relates only to a preferred embodiment of the invention, and that it is intended to cover all changes and modifications of the example of the invention herein chosen for the purpose of the disclosure which do not constitute departures from the spirit and scope of the invention set forth in the appended claims.

What is claimed is:

1. A valve comprising:
   a. a casing having a plurality of sections juxtaposed in a row,
      1. each section defining a cavity therein and being formed with two ports aligned in the direction of said row with the ports of the other sections;
   b. a valve seat member interposed between each pair of juxtaposed sections and formed with an aperture aligned with said ports in said direction, whereby two valve seat members are associated with each of said sections;
   c. a drive member passing through the aligned ports and apertures;
   d. two valve disc members mounted on said drive member in the cavities of respective sections for movement with said drive member between respective first and second positions,
      1. each valve disc member in said first position thereof sealingly engaging one valve seat member associated with the cavity receiving said valve disc member, said valve disc member in said second position sealingly engaging the other valve seat member associated with said receiving cavity,
      2. said valve disc member having a cross section transverse to said direction greater than the cross sections of the apertures in said one valve seat member and in said other valve seat member;
   e. two throttling members oppositely projecting from said valve disc member in said direction,
      1. one throttling member being received in the aperture of said one valve seat member when said valve disc member is in said first position thereof, and the other throttling member being received in the aperture of said other valve seat member when said valve disc member is in said second position thereof,
      2. the cross section of each throttling member transverse to said direction being smaller than the cross section of the receiving aperture, whereby said throttling members and the associated valve seat members define gaps therebetween when said valve disc members approach said first and second positions thereof,
      3. the dimensions of said gaps respectively defined by the throttling members on one of said valve disc members with the associated valve seat members differing from the dimensions of the gaps simultaneously defined by the throttling members mounted on the other valve disc member with the associated valve seat members.

2. A valve as set forth in claim 1, wherein said one throttling member on each valve disc member is axially spaced from said one valve disc member when said valve disc member is in said second position thereof, and said other throttling member is axially spaced from said other valve seat member when said valve disc member is in said first position.

3. A valve as set forth in claim 1, wherein at least one of said throttling members is annular and tapers in said direction away from the associated valve disc member.

4. A valve as set forth in claim 1, wherein at least one of the associated throttling members tapers conically away from said valve disc member in said direction.

5. A valve as set forth in claim 1, wherein the projecting length of said one throttling member is greater than the length of the aperture of the engaged one valve seat member in the direction of movement of said valve disc member between said positions thereof, but smaller than the spacing of said first and second positions.

6. A valve as set forth in claim 5, each section has a wall of uniform cross section bounding each of said ports transversely to said direction, the combined length of said aperture of said first valve seat member and of said wall in said direction being at least equal to said projecting length of said throttling member.

7. A valve as set forth in claim 6, wherein each of said valve disc members is received in one of said ports when in said first and second positions, the cross section of each port being greater than the cross section of the valve disc member received therein, whereby said wall bounding the port and the valve disc member received in said port define a gap therebetween.

8. A valve as set forth in claim 6, wherein each of said sections is formed with an opening leading outward of the cavity thereof transversely to said direction.

9. A valve as set forth in claim 1, wherein the throttling portions of said two valve disc assemblies differ from each other in at least one dimension.

10. A valve as set forth in claim 1, further comprising resilient mounting means securing said valve disc assemblies to said drive member for limited movement in said direction and yieldably resisting said limited movement.

* * * * *